United States Patent Office  
3,564,547  
Patented Feb. 16, 1971

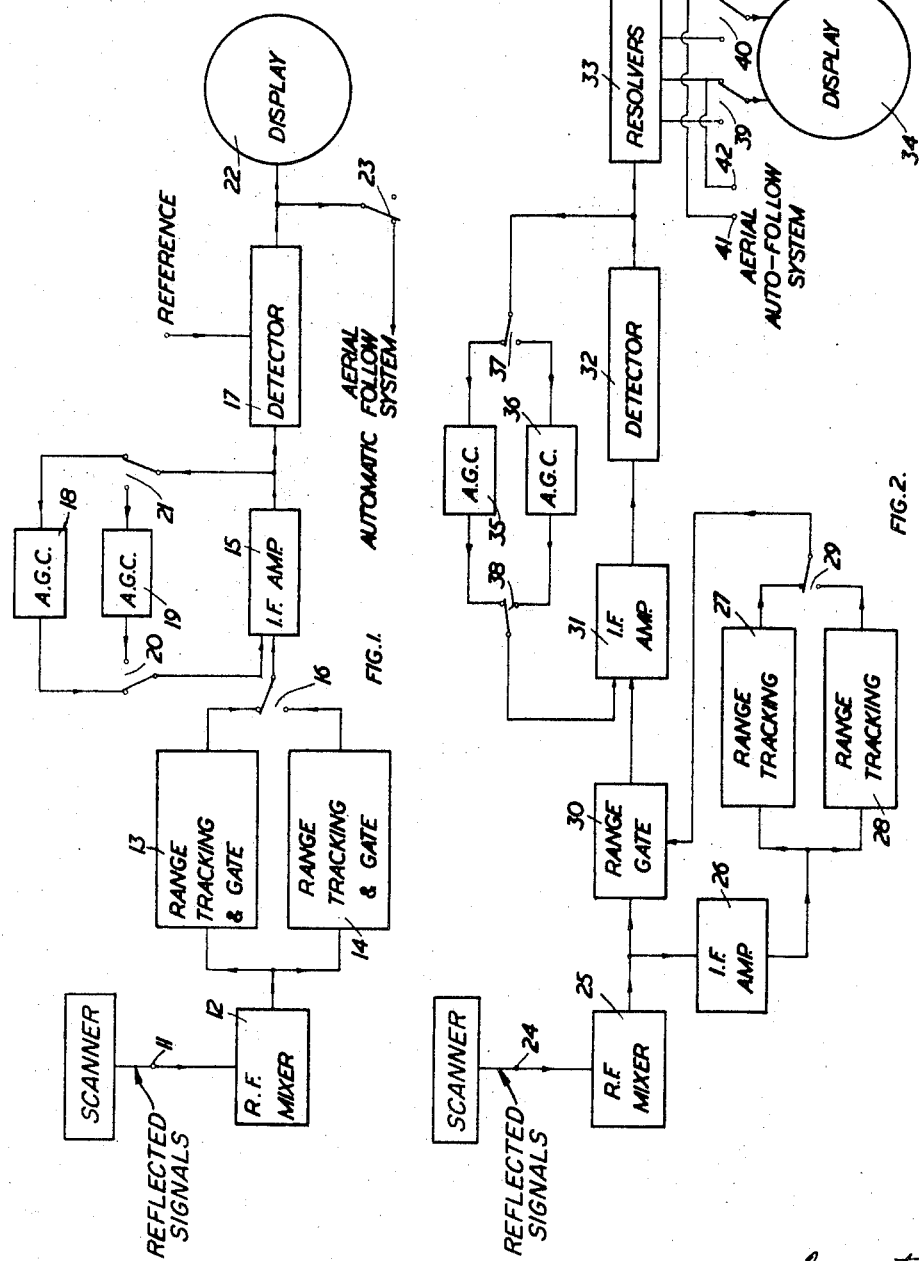

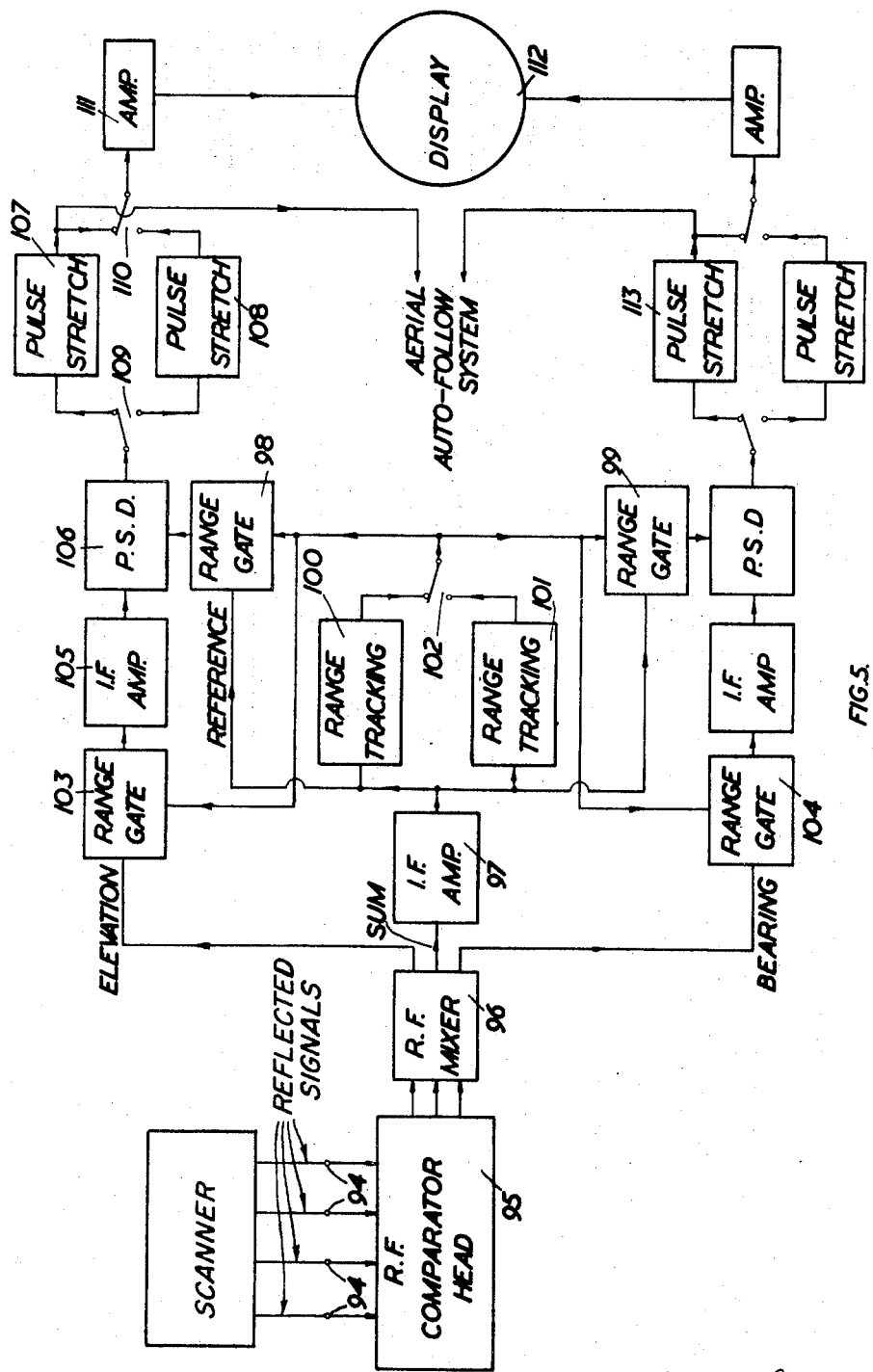

3,564,547  
RADAR APPARATUS FOR MISSILE GUIDANCE CONTROL  
John Dent, Greenhill, Dundonald, County Down, Northern Ireland, assignor to Short Brothers & Harland Limited, Belfast, Northern Ireland  
Filed June 3, 1960, Ser. No. 33,859  
Int. Cl. G01s 9/14  
U.S. Cl. 343—7.3            3 Claims The present invention relates to missile guidance apparatus for use in homing a missile on to a target and is particularly though not exclusively concerned with such apparatus for homing an airborne missile on to an airborne moving target such as an aircraft.

It is now common practice to control the flight of a missile from a ground or surface station through a radio command link between the station and the missile, the operator at the station being provided with a joystick or like control column which he can move so as to generate control signals which are transmitted over the radio link to the missile and applied to flight control apparatus in the missile for maneuvering the missile.

In one form of apparatus which has been proposed the operator is required to observe the target and missile through an optical sighting arrangement and to guide the missile to the target from the visual observations which he makes. It will be apparent however that such apparatus has the drawback that it can only be used when both the target and missile are visible.

It is the principal object of the present invention to provide improved missible guidance apparatus which can be employed by a human operator to guide a missile to a target when the target and the missile cannot be observed directly.

It has already been proposed for the purpose of achieving the above mentioned object to provide separate radar scanning systems for the target and missile. However, such an arrangement is regarded as unacceptable because the inaccuracies of the two separate radar systems are additive and give rise to large missile guidance errors.

It may be thought that a single conventional radar scanning system could be employed to scan the area occupied by the target and the missile and provide a conventional P.P.I. display of the scanned area, showing the target and missile. Such a system is, however, unacceptable for the reason that some form of signal strobing, which is necessary to provide a clear display, cannot be employed.

According to the present invention there is provided a missile guidance apparatus for use in homing a missile on to a target comprising a signal receiver adapted to receive together signals from the target and signals from the missile, and control means for separating said target and missile signals or signals derived therefrom and feeding them in separate channels through one or more common signal-processing circuits to produce on a screen a simultaneous display or an apparently simultaneous display of an image of the target and an image of the missile.

Preferably, the separate channels are time division channels, and the said control means comprise switching means for applying the separated signals in time-interlaced relation to said common circuit or circuits. With such an arrangement, the control means may then include signal separating means comprising target range-tracking apparatus generating gating signals for isolating the target signals and missile range-tracking apparatus for generating gating signals for isolating the missile signals.

Alternatively, the control means may comprise target and missile range-tracking apparatus for generating gating signals for isolating the target signals and the missile signals, and switching means including a switch for applying the target gating signals and the missile gating signals in time-interlaced relation to a gate so as to allow the gate to transmit the target and the missile signals in predetermined time-interlaced relation to said common circuit or circuits.

Some embodiments of the invention will now be described by way of example with reference to the accompanying drawings in which:

FIG. 1 is a schematic block diagram of apparatus according to a first embodiment of the invention.

FIG. 2 is a schematic block diagram of apparatus according to a second embodiment of the invention.

FIG. 5 is a schematic block diagram of apparatus according to a fourth embodiment of the invention for use with a static split feed radar receiving aerial.

Figure 3:
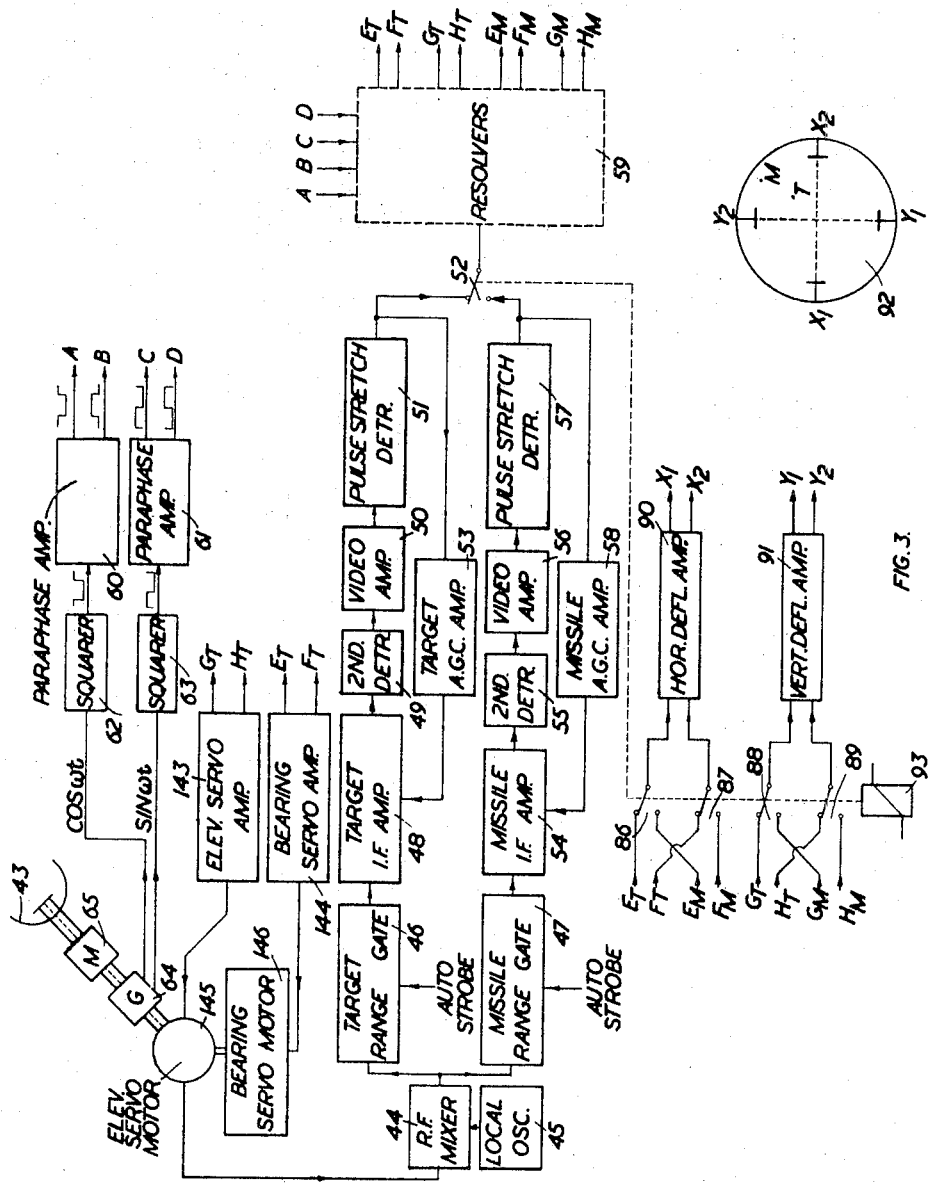
FIG. 3 is a schematic block diagram of a third embodiment of the invention utilizing a conical radar scanning aerial.

Referring first to FIG. 1, there is shown in schematic form a radar receiver for processing radar signals transmitted from a radar scanner (not shown) and reflected from a remote target and a missile. The reflected signals received by the scanner are applied to an input terminal 11 from which they are fed to a radio frequency mixer circuit 12 in which they are converted to signals of intermediate frequency and from which they are fed to two range-tracking and gating circuits 13 and 14, the outputs of which are applied alternately to a common intermediate frequency amplifier 15 through a set of changeover contacts 16. Each of the range-tracking and gating circuits 13 and 14 is of conventional form and is arranged to open for a short period to allow the passage therethrough of a signal which it is set to track. The range-tracking and gating circuit 13 is arranged to open to transmit the signals received from the target and the circuit 14 is arranged to open to transmit signals received from the missile. Circuits suitable for use as the range-tracking and gating circuits 13 and 14 are described at pp. 173 and 174, 207–210, 518–524 and 705, in "Radar System Engineering," edited by L. N. Ridenour, M.I.T. Radiation Laboratory Series No. 1, published by McGraw-Hill, 1947. The set of changeover contacts 16 forms part of a time-sharing switch (not shown) which is operated continuously at a predetermined rate so that the movable contact of the contact set 16 switches alternately between the position shown in the drawing and its other position and thereby produces an input to the amplifier 15 which comprises target and missile signals applied in time-interlaced fashion. The switching frequency of the time-sharing switch is arranged to be low compared with the pulse repetition frequency of the received signals and of substantially square waveform. The switch may be an electronic switch or an electromagnetic relay provided with changeover contacts. In the latter arrangement, the switching frequency may be as low as 10 cycles per second. With received signals of a pulse repetition frequency of say 400 p.p.s. the switch would transmit 40 received signals per switching cycle. The loss of one or a few received signals during the changing over of the contacts 16 is of no consequence. Faster switching may, if desired, be obtained using an electronic switch locked to the transmitted signals so that changeover occurs when no received signal is present.

The output of the amplifier 15 is fed to a detector 17 and also to one or the other of two automatic gain control circuits 18 and 19. The automatic gain control circuit 18 is employed to control the gain of the ampliler 15 when the target signals are being transmitted thereby and the gain control circuit 19 is employed to control the gain of the amplifier 15 when the missile signals are transmitted thereby, the arrangement being such as to effect an equalisation of the signals received from the target and the missile so that the scale factor in a display which they produce is the same for both. The switching of the gain control circuits 18 and 19 is effected by two sets of changeover contacts 20 and 21 which form part of the time sharing switch hereinbefore referred to. The time constants of the automatic gain control units 18 and 19 are long compared with the switching periodicity of the time sharing switch, which in turn is long compared with the time constant of the amplifier 15. Such an arrangement ensures that the amplifier gain is set to the correct value virtually instantaneously after each switching operation effected by the time sharing switch.

The detector 17 derives from the amplified signal applied thereto voltages representing the positions of the target and missile relative to the axis of the radar scanner. These voltages appear sequentially and are applied to a cathode ray tube display apparatus 22 to provide thereon an image of the target and an image of the missile.

As shown, the output of the detector 17 is applied via a further set of changeover contacts 23 to apparatus for automatically controlling the radar scanner position. The set of contacts 23 form part of the time sharing switch and are arranged so as to transmit only the target signals to the scanner control apparatus, which are utilised thereby to cause the scanner to track the target.

It will be clear from what has been described that the apparatus shown in FIG. 1 makes use where possible of common circuits for operating on the target and missile signals. In fact, a single radar scanner is employed and the target and missile signals are fed through the common mixer circuit 12. The range-tracking and gating circuits 13 and 14 together with the set of changeover contacts 16 of the time sharing switch serve to isolate and separate the target and missile signals and to apply them in time-interlaced fashion to the common amplifier 15 from which they are fed to the common detector 17 and from there to the common display apparatus 22. Separate automatic gain control circuits 18 and 19 are provided as hereinbefore described to provide equalisation of the input signals to the display apparatus 22.

Referring now to FIG. 2, this shows a signal receiver according to a second embodiment of the invention, which can be used with a conical scan type radar aerial. Reflected target and missile signals are fed to an input terminal 24 from which they are applied to a mixer circuit 25 where they are converted to signals of intermediate frequency. Signals from the mixer circuit 25 are applied to an intermediate frequency amplifier 26 and from there to two conventional range-tracking circuits 27 and 28, the circuit 27 serving to generate gating signals for gating the target signals and the circuit 28 serving to generate signals for gating the missile signals. The outputs of the circuit 27 and 28 are fed via a set of changeover contacts 29 of a time sharing switch (not shown) to the control terminal of a range gate 30 which is fed with target and missile signals from the mixer circuit 25. The arrangement is such that the contact set 29 is switched continuously between its two positions to transmit the target and missile gating signals alternately to the range gate 30 so that the output of the range gate 30 comprises strobed and time-interlaced target and missile signals. These signals are applied to an amplifier 31 from which they are fed to a detector 32 the output of which is applied to resolver 33 which is employed to resolve the target and missile signals into components suitable for application to a cathode ray tube display apparatus 34. Automatic gain control circuits 35 ad 36 are alternately connected in circuit by sets of contacts 37 and 38 which form part of the time sharing switch, the arrangement and manner of operation of these circuits being identical with that of the circuits 18 and 19 shown in FIG. 1.

For the purpose of resolving the target and missile signals into quadrature components, use is made in the resolver 33 of a reference signal derived from the conical scan radar aerial (not shown). The resolving unit 33 has four outputs two of which represent the quadrature components of the target signals and the other two of which represent the quadrature components of the missile signals. Two sets of changeover contacts 39 and 40 of the time sharing switch hereinbefore referred to are employed to apply the component target signals and the component missile signals to the display apparatus 34 alternately. The component target signals are applied to output terminals 41 and 42 from which they are fed to control apparatus for automatically moving the radar scanner aerial so that it tracks the target.

Referring now to FIG. 3 this shows schematically a modified form of the apparatus shown in FIG. 2. Target and missile signals are received by a conical scan radar aerial 43 and these signals are fed to a mixer circuit 44 to which is also applied the output of a local oscillator 45. The mixer circuit provides outputs signals of intermediate frequency and these intermediate frequency signals are applied to a target range gate 46 and a missile range gate 47. The gates 46 and 47 are opened by gating signals applied thereto from associated range-tracking circuits (not shown) so that the output of the gate 46 consists only of target signals and the output of the gate 47 consists only of missile signals. The target signals from the gate 46 are amplified in an amplifier 48 from which they are fed to a detector 49 followed by a video amplifier 50 and a pulse stretch detector 51. The output of the pulse stretch detector 51 is applied to one fixed contact of a set of change-over contacts 52 and also to an automatic gain control amplifier 53 the output of which is applied to control the gain of the amplifier 48. In like manner the missile signals from the gate 47 are amplified in an amplifier 54 from which they are applied to a detector 55 followed by a video amplifier 56 and a pulse stretch detector 57, the output of the latter detector being fed to the other fixed contact of the contact set 52 and also to an automatic gain control amplifier 58, the output of which is applied to control the gain of the amplifier 54. It will be seen that the target and missile signals are separated after leaving the mixer circuit 44 and pass through parallel paths including duplicated range-gating, amplifying and automatic gain control circuits. Such an arrangement may be employed with advantage where it is desired to keep the receiver components of conventional design.

The set of changeover contacts 52 form part of a time sharing switch, which is operated continuously at a predetermined frequency so as to switch the contact set back and forth between its two positions. The output of the switch 52 is fed to a resolver circuit 59 shown in block form in FIG. 3 and in detail in FIG. 4. This resolver circuit is fed with reference square-wave signals A, B, C and D derived from paraphrase amplifiers 60 and 61 supplied from squarer circuits 62 and 63, to which are fed two 90° phase-displaced sinusoidal oscillations generated by a two-phase sinusoidal generator 64 coupled to the aerial spin motor 65.

Figure 4:
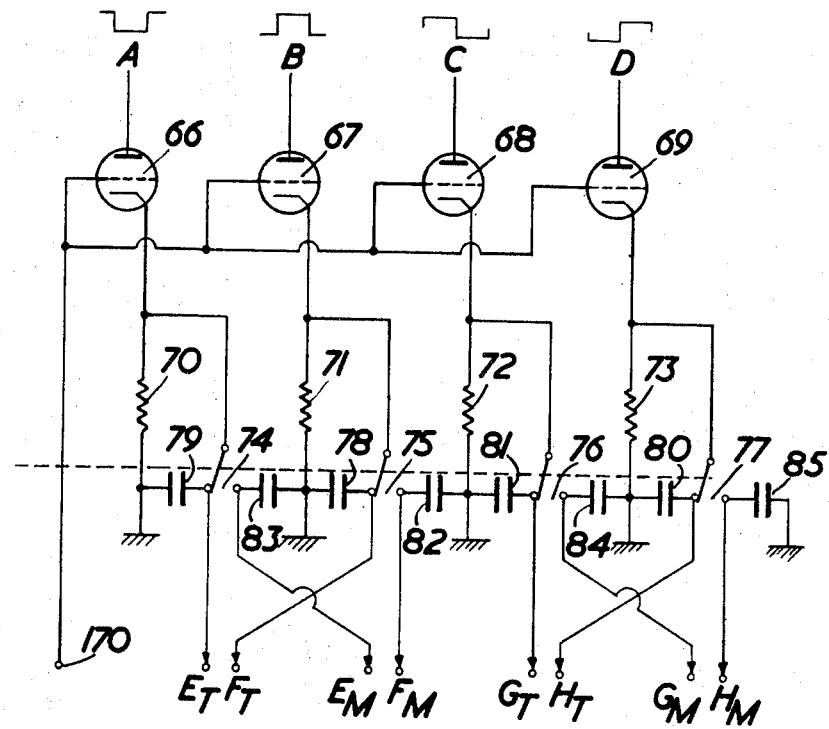
FIG. 4 is a circuit diagram of the resolver shown in block form in FIG. 3.

Referring now to FIG. 4, the square wave reference signals A, B, C and D are applied to the anodes respectively of four triode valves 66–69, the control electrodes of which are fed with signals from an input terminal 170 connected to receive the output from the contact set 52 shown in FIG. 3. The cathodes of the valves 66–69 are connected to earth or other point at a suitable potential through load resistors 70–73 and to the movable contacts of changeover contacts sets 74–77, each of which forms part of the time sharing switch hereinbefore referred to and all of which are operated in synchronism. The fixed contacts of the contact sets 74–77 are connected to output terminals $E_T$, $F_T$, $E_M$ $F_M$, $G_T$ $H_T$ and $G_M$ $H_M$.

The reference signals are assumed to be disposed as shown in FIG. 4 during a typical cycle of repetition of the scan. It may be seen that they permit conduction of the valves 66–69 for one half-cycle out of each cycle of the scan and prevent conduction during the intervening half-cycles. The phasing of this operation differs between the valves and in FIG. 4 they are operated in the order 68, 67, 69, 66 at phase intervals of one quarter of the scan cycle.

In operation, assuming that the movable contact of the contact set 52 in FIG. 3 is in the position shown, target signals are conducted to the input terminal 170 and applied to the control electrodes of the valves. Charging currents are then applied to the capacitors 79, 78, 81 and 80, from valves 66, 67, 68 and 69 respectively, but only during those periods for which conduction is permitted in the respective valve by the associated reference waveform and of magnitude appropriate to the amplitude and phase of the target signals. The output voltage appearing across the terminals $E_T$ and $F_T$ provides a measure of the target bearing relative to the radar scan axis and that across terminals $G_T$ and $H_T$ a measure of the target relative elevation.

Switching of the time-sharing switch results in the changeover of contacts 52 so that missile signals are then applied to the control electrodes of the valves 66–69 and, under these conditions, the output voltages across the pairs of terminals $E_M$, $F_M$ and $G_M$, $H_M$ provide measures of missile bearing and elevation respectively relative to the radar scan axis.

Returning now to FIG. 3 the target output voltages appearing at the terminals $G_T$, $H_T$ and $E_T$, $F_T$ of the resolving circuit shown in FIG. 4 are fed to elevation and bearing servo amplifiers 143 and 144 which control elevation and bearing servo motors 145 and 146 to provide tracking of the target by the scanner 43.

Referring again to FIG. 3, the output voltages from the resolving circuit shown in FIG. 4 are applied in the manner shown to further sets of changeover contacts 86–89, which form part of the time-sharing switch and which serve to connect the resolved target and missile outputs alternately to horizontal beam deflection amplifier 90 and vertical beam deflection amplifier 91 of a cathode ray tube 92 shown schematically in FIG. 3.

The time-sharing switch heretofore referred to takes the form of a relay 93 having the contacts specified and operated by a square wave control voltage applied to the winding thereof.

Referring now to FIG. 5, there is shown in schematic form a receiver according to this invention which is suitable for use in receiving signals reflected from a target and missile and collected by a conventional static split feed radar aerial. As is well known, with such an aerial four component signals are generated which provide information of the elevation and bearing of the object giving rise to the reflection. These four signals are fed from the aerial to input terminals 94 from which they are applied to a comparator head 95 of convention form which generates three output signals, one constituting a reference signal and being a measure of the sum of the four input signals and the other two signals being measures of the elevation and bearing of the object giving rise to the reflection. With a target and missile in the radar beam, elevation and bearing signals of both as well as reference signals of both appear together at the output of the comparator 95.

The elevation, bearing and reference signals from the comparator 95 are applied to a radio frequency mixer 96 where they are converted to an intermediate frequency and from which the reference signal is fed to an intermediate frequency amplifier 97. The output of this amplifier is fed to two range gates 98 and 99 and to two range tracking circuits 100 and 101. The range-tracking circuits 100 and 101 are of conventional form, circuit 100 providing gating signals for gating the target signals and the circuit 101 providing gating signals for gating the missile signals. The outputs of the circuits 100 and 101 are applied through a set of change-over contacts 102 to the range gates 98 and 99 and further range gates 103 and 104. The target and missile elevation signals are fed to the range gate 103 and the target and missile bearing signals are fed to the range gate 104. The target and missile elevation signals are strobed by the range gate 103 and are applied to an intermediate frequency amplifier 105 from which they are fed to a phase sensitive detector 106 to which is also applied the appropriate reference signal fed from the amplifier 97 and passed by the gate 98. The output of the phase detector 106 is applied alternately to pulse stretch units 107 and 108 by the alternate switching of contacts 109 and 110, the units 107 and 108 serving to equalise the pulse lengths of the target and missile signals before application to the control circuit of a common display apparatus. As shown the outputs of the pulse stretch units 107 and 108 are fed alternately to an amplifier 111, the output of which is applied to the vertical deflection plates of a cathode ray tube 112.

The target and missile bearing signals from the range gate 104 are operated upon in the same manner as the elevation signals and are applied alternately to the horizontal deflection plates of the cathode ray tube 112. The outputs of the target elevation pulse stretch unit 107 and its corresponding target bearing pulse stretch unit 113 are a measure of the misalignment between the radar scanner axis and the target and are applied as control signals to an aerial servo control system to cause the aerial to track the target in position.

Figure 6:
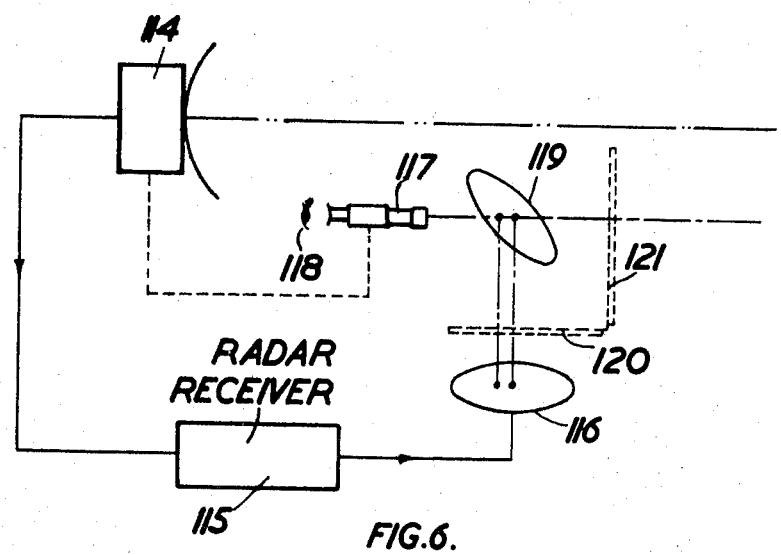
FIG. 6 is a shematic diagram of an arrangement whereby the station operator may view the target area and a cathode ray tube display of the target area simultaneously or alternatively.

Referring now to FIG. 6, this shows schematically an arrangement whereby the human operator provided with an optical system for direct viewing of the target can also view simultaneously or alternatively the display of the target and missile on a cathode ray tube. Such an arrangement may be employed with any of the radar receivers and aerials hereinbefore described. The radar aerial employed is shown schematically at 114 and the radar receiver at 115. The output of the receiver 115 provides a display on a cathode ray tube screen schematically represented at 116. The radar aerial is mechanically coupled to an optical sighting apparatus 117 through which the target can be observed directly by an operator 118. In all the embodiments hereinbefore described the radar serial is locked on to the target and the mechanical coupling shown in FIG. 6 is such as to maintain the optical sighting apparatus also directed on to the target. Across the sight line at a short distance in front of the sighting apparatus there is provided a semi-silvered mirror 119 located at an angle of 45° with respect to the sight line so that the operator 118 when viewing the target directly through the optical sighting apparatus 117 can also see a partial reflection in the semi-silvered mirror 119 of the cathode ray tube display 116. The disposition of the cathode ray tube, the optical sighting apparatus and the mirror is such that the optical and cathode ray tube images of the target and missile appear coincident to the operator 118. In some circumstances, it may be a disadvantage to have the two views superimposed and shutters 120 and 121 are therefore provided to shut off either the direct view or the cathode ray tube display.

Figure 7:
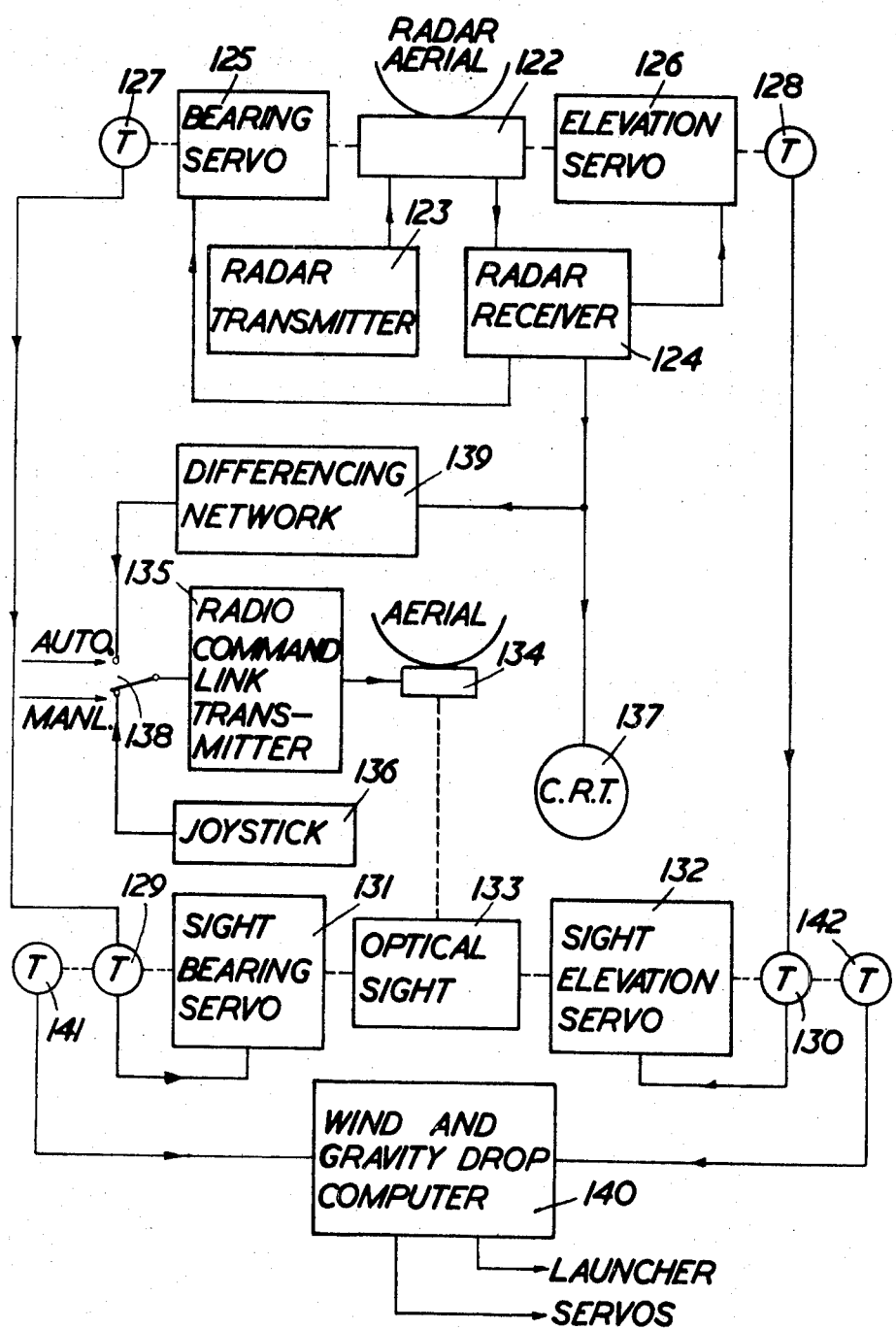
FIG. 7 is a schematic block diagram of a general arrangement for missile guidance, embodying apparatus according to the invention.

Referring now to FIG. 7, this shows a general arrangement of missile guidance apparatus according to this invention. The radar aerial shown at 122 may be of the conical scan type or of the static split feed type and is fed in conventional manner with signals from a radar transmitter 123. Signals reflected from a distant target and missile are received by the aerial and applied to a radar receiver 124 where they are processed as hereinbefore described. The receiver may take the form of any of the embodiments hereinbefore described.

The drive for the aerial 122 in elevation and bearing is provided by elevation and bearing servo motors 125 and 126 which are fed with control signals derived from the radar receiver 124 in the manner hereinbefore described, the arrangement being such that the radar aerial is caused to follow and track the target. The servo motors 125 and 126 are provided with synchro transmitters 127 and 128 which transmit signals to synchro differential units 129 and 130 which control in known manner sight bearing and elevation servo motors 131 and 132 which serve to drive an optical sighting arrangement 133 in bearing and elevation so that it maintains the same direction as the radar aerial and so tracks the target.

The optical sighting arrangement 133 is mechanically coupled to a radio command link transmitter aerial 134 so that the latter also tracks the target. The aerial 134 is fed with signals from a transmitter 135 to which are applied input control signals derived from a joystick control unit 136.

The output of the radar receiver 124 is applied to cathode ray tube 137 to produce as hereinbefore described a display of the target and the missile.

The operator using the arrangement shown in FIG. 6 views the target and missile either directly through his optical sighting arrangement or the images thereof on the cathode ray tube 137. Using the information he receives, he moves the joystick in such a way as to direct the missile to the target. The control signals generated by the joystick control unit 136 are transmitted over the radio command link from the aerial 134 to the missile and serve to control the flight of the missile so as to home it on to the target. If the operator so desires he can throw over a manually operable switch 138 so that the missile is controlled by signals transmitted thereto over the link from a network 139. The network 139 is fed with target and missile output signals from the radar receiver 124 and operates on them to provide a measure of the relative displacement of the missile from the target in bearing and elevation. From such measurement control signals are derived which upon transmission to the missile so direct it as to reduce the displacement.

A launcher platform (not shown) is adapted to be driven by servo motors (not shown) so that it also tracks the target. These servo motors are controlled by signals derived from synchro-transmitters 141 and 142 coupled to the bearing and elevation servo motors 131 and 132 of the optical sighting arrangement 133. In order to take account of the effects of cross wind and gravity on the missile at the instant of launching there is provided a computor 140 which modifies the signals derived from the synchro-transmitters 141 and 142 so as to produce signals for application to the missile launcher servo motors which will so move the launcher platform as to compensate for these effects.

What I claim as my invention and desire to secure by Letters Patent is:

1. Missile guidance apparatus for use in homing a missile on to a target comprising:
    means for irradiating the target and the missile with pulsed radar signals,
    a signal receiver for receiving in a common channel pulsed radar signals reflected from the target and pulsed radar signals reflected from the missile,
    means for separating the target signals from the missile signals,
    a signal processing circuit,
    means for feeding the separated target signals in one time-division channel and the separated missile signals in another time-division channel through said signal processing circuit common to the two time-division channels,
    means for producing on a screen continuous displays of an image of the target and an image of the missile,
    said signal receiver comprising a radar scanner adapted to be so controlled as to track the target,
    an optical viewing system arranged to be driven so as to follow the movements of the radar scanner and thereby track the target, and
    means for optically projecting the said display of the target and missile so that an observer can observe an image thereof superimposed upon the optical image of the optical viewing system.

2. Apparatus according to claim 1, wherein said means for projecting the display comprises a semi-silvered mirror arranged in the line of sight of the optical viewing system.

3. Apparatus according to claim 1 wherein shutters are provided to obscure at will either the direct view image or the said display image.

References Cited

UNITED STATES PATENTS

| | | | |
|---|---|---|---|
| 2,409,462 | 10/1946 | Zworykin | 343—11 |
| 2,653,310 | 9/1953 | Allen et al. | 343—5 |
| 2,950,474 | 8/1950 | Page | 343—7 |
| 2,751,587 | 8/1956 | Tasker et al. | 343—5 |
| 2,997,706 | 8/1961 | Easy et al. | 343—5 |
| 3,093,821 | 6/1963 | Alpers et al. | 343—7 |
| 2,745,095 | 5/1956 | Stoddard | 343—7(ED(UX |
| 3,166,745 | 1/1965 | Engledew et al. | 343—7(RS)X |

RICHARD A. FARLEY, Primary Examiner

T. H. TUBBESING, Assistant Examiner

U.S. Cl. X.R.

343—7